(12) United States Patent
Lim et al.

(10) Patent No.: US 11,637,434 B2
(45) Date of Patent: Apr. 25, 2023

(54) PROTECTION OF PARALLEL BATTERY CELLS IN A BATTERY

(71) Applicant: Google LLC, Mountain View, CA (US)

(72) Inventors: James Robert Lim, Mountain View, CA (US); David Wang, San Jose, CA (US); Bonnie Yip, San Francisco, CA (US); Haoxing Zhang, Campbell, CA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 17/222,230

(22) Filed: Apr. 5, 2021

(65) Prior Publication Data
US 2021/0376625 A1 Dec. 2, 2021

Related U.S. Application Data

(60) Provisional application No. 63/032,299, filed on May 29, 2020.

(51) Int. Cl.
*H02J 7/00* (2006.01)
*H01M 10/42* (2006.01)
*H02H 7/18* (2006.01)

(52) U.S. Cl.
CPC ......... *H02J 7/0031* (2013.01); *H01M 10/425* (2013.01); *H02H 7/18* (2013.01); *H02J 7/00302* (2020.01); *H02J 7/00308* (2020.01); *H01M 2010/4271* (2013.01)

(58) Field of Classification Search
CPC .................................................. H02J 7/0031
See application file for complete search history.

(56) References Cited

U.S. PATENT DOCUMENTS 5,254,930 A 10/1993 Daly
2019/0379219 A1* 12/2019 Snyder ................ H02J 7/00304

FOREIGN PATENT DOCUMENTS

JP 4171742 10/2008

* cited by examiner

*Primary Examiner* — Robert Grant
(74) *Attorney, Agent, or Firm* — Colby Nipper PLLC (57) ABSTRACT

This application is directed to a battery protection system including a sense resistor, a comparator, a switching component, and a protection integrated circuit (PIC). The sense resistor is electrically coupled in series with one of a plurality of rechargeable battery cells that are coupled in parallel in a battery. The comparator is coupled to the sense resistor and configured to compare a voltage drop across the sense resistor with a reference voltage to determine whether a subset of the rechargeable battery cells is not charging in the battery. The switching component is coupled to the battery, while the PIC is coupled to the comparator and the switching component. The PIC is configured to control charging and discharging of the battery including disabling the battery from being charged in accordance with a determination that a subset of the rechargeable battery cells is not charging in the battery.

20 Claims, 9 Drawing Sheets

PROTECTION OF PARALLEL BATTERY CELLS IN A BATTERY

RELATED APPLICATION

This application claims priority under 35 U.S.C. § 119(e) to U.S. Provisional Patent Application 63/032,299, filed on May 29, 2020, the disclosure of which is incorporated by reference herein in its entirety.

BACKGROUND

Traditional rechargeable lithium-ion batteries must be charged carefully due to safety concerns such as overheating or combustion that could result from charging at excessive rates or to an excessive voltage. Moreover, when multiple lithium-ion battery cells are configured in parallel to form a higher capacity battery (e.g., a so-called 1S2P configuration in which two battery cells are connected in parallel), the battery is charged as a single unit based on the specifications and capacities of its constituent battery cells. Recently, chargers with fast charging rates have become popular. Such fast chargers for example are capable of charging an electronic device within one hour. Fast chargers deliver charging current to a battery at a high but safe charging rate presuming that all of the battery cells in the battery are operating within specifications. However, if a single battery cell in a parallel battery is not connected or otherwise unable to be charged, during charging the remaining battery cells will receive a significantly increased charge compared to what they would have received if all of the battery cells were connected or otherwise available for charging. For example, in a 1S2P parallel battery, when one battery cell is not connected, the other battery cell in the pack would be subject to two times (2x) normal charge current. The significantly increased charge current in this situation could exceed the maximum charging rate for a single battery cell (as defined by specifications) and create safety concerns. As such, there is a need for safety protection and hardware detection for parallel battery cell designs.

SUMMARY

The present disclosure describes implementations of systems and methods for battery protection. More particularly, safety protections and hardware detection mechanisms described herein include, but are not limited to, a hardware protection circuit module (PCM) that monitors the health of a battery that includes two or more individual battery cells connected in parallel. The PCM can be implemented using integrated and/or discrete circuit elements and is deployed in conjunction with a battery whose health the PCM is monitoring. The methods and systems do not require any interaction and/or intervention from system components of an electronic device in which the battery is used.

In some implementations, the PCM includes a sense resistor coupled in series with one of the battery cells in a multi-cell parallel battery and comparator logic that compares the voltage drop across the sense resistor to a reference voltage to determine whether the battery cell to which the sense resistor is coupled is within or outside charging specifications. If the comparator logic determines that the voltage drop is too large (indicating that one or more of the other parallel battery cells in the battery is not charging per specification) or at or near zero volts (indicating that the battery cell to which the resistor is coupled is disconnected or otherwise not charging), the comparator will cause the PCM to interrupt the charging operation. In some implementations, when an uncharged battery cell is detected, the comparator outputs a control signal to a protection integrated circuit (PIC), which in response opens a switching component (e.g., made of a charge field effect transistor (FET)) to disable charging of the battery.

By deploying the PCM in conjunction with the battery, the need for a system connection to the PCM is eliminated, which reduces system cost and complexity of the electronic device. Also, since the PCM design is coupled with and based on the configuration of the parallel battery it is protecting, uncharged battery cells are quickly identified and charging of the battery disabled to prevent dangerous charging situations.

In one aspect, a battery protection system includes a sense resistor electrically coupled in series with one of a plurality of rechargeable battery cells in a battery. The plurality of rechargeable battery cells are electrically coupled in parallel to form the battery. In an example, the battery has a 1S2P battery configuration. The battery protection system includes a comparator coupled to the sense resistor, the comparator configured to compare a voltage drop across the sense resistor with a reference voltage to determine whether a subset of the plurality of rechargeable battery cells is not charging in the battery, when the battery is being charged. The battery protection system further includes a first switching component coupled to the battery, and a first PIC coupled to the comparator and the first switching component. The first PIC is configured to control charging and discharging of the battery including disabling the battery from being charged in accordance with a determination that a subset of the plurality of rechargeable battery cells is not charging.

In some implementations, the comparator and the first PIC are formed on a first substrate. In these implementations, the first switching component can be formed on the same first substrate or a second substrate distinct from the first substrate.

In some implementations, the comparator is a discrete component included on a first substrate, and the first PIC is included on a second substrate that is distinct from the first substrate. In these implementations, the first switching component can be formed on the same second substrate or on a third substrate distinct from the second substrate.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Figure 1A:
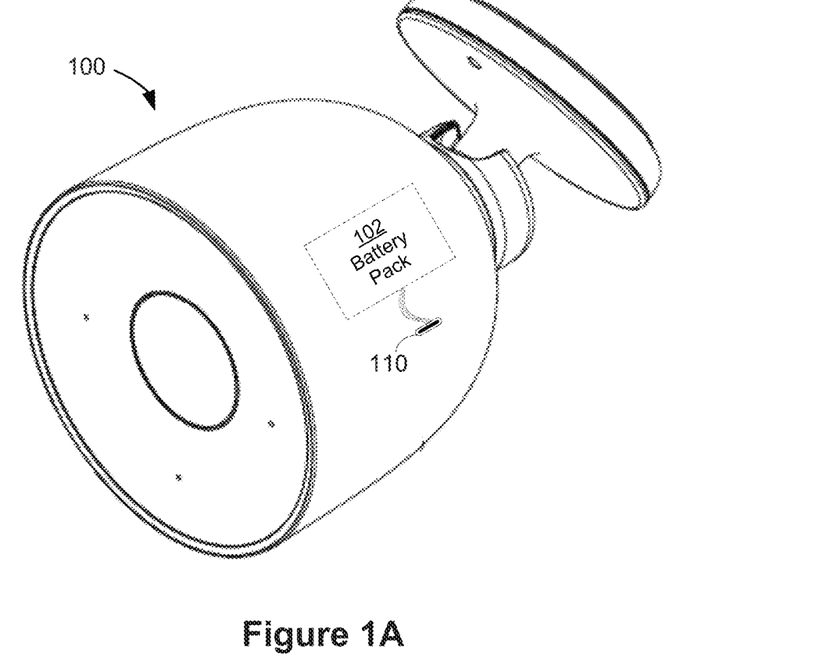
FIG. 1A illustrates an electronic device including a battery, in accordance with some implementations.

FIG. 1A shows an electronic device 100 including a rechargeable battery 102 in accordance with some implementations. The electronic device 100 can be a camera as shown, or a doorbell, a door lock, a display, a connected assistant device, a display assistance device, a speaker assistance device, an alarm, a hazard detector, a security detector, a thermostat, or any other type of electronic device that is powered by a rechargeable battery 102. In some implementations, the electronic device 100 includes one or more components, such as one or more: audio devices, light sources, sensors, CPU(s), memory, data input devices, data output devices, image sensor array, infrared illuminators, filters, etc., any of which is powered by the rechargeable battery 102. In some implementations, the electronic device 100 is configured to connect electronically with an external device through a wired connection (e.g., a Universal Serial Bus (USB) cable, a power cable, an High-Definition Multimedia Interface (HDMI) cable, etc.). The wired connection may allow power and/or data transmission between the external device and electronic device 100. For example, the wired connection can be used to provide power and/or charge to the battery 102.

Alternatively or additionally, in some implementations, the electronic device 100 includes one or more (external and/or visible) ports or connectors 110 for wired connections to the various components of the electronic device 100. As mentioned above, the wired connections can be USB or HDMI connectors, power connectors, etc. In some implementations, the one or more ports 110 are on an exterior surface of the electronic device 100 and allow for external access to the various components of the electronic device 100. In some implementations, the one or more ports 110 of the electronic device 100 can be used to charge the battery 102. For example, as described in more detail below, a wired connection between a port 110 of the electronic device 100 and an external power source (e.g., a portable power cell, power generator, power bank, etc.) can be used to provide power and/or charge the battery.

Figure 1B:
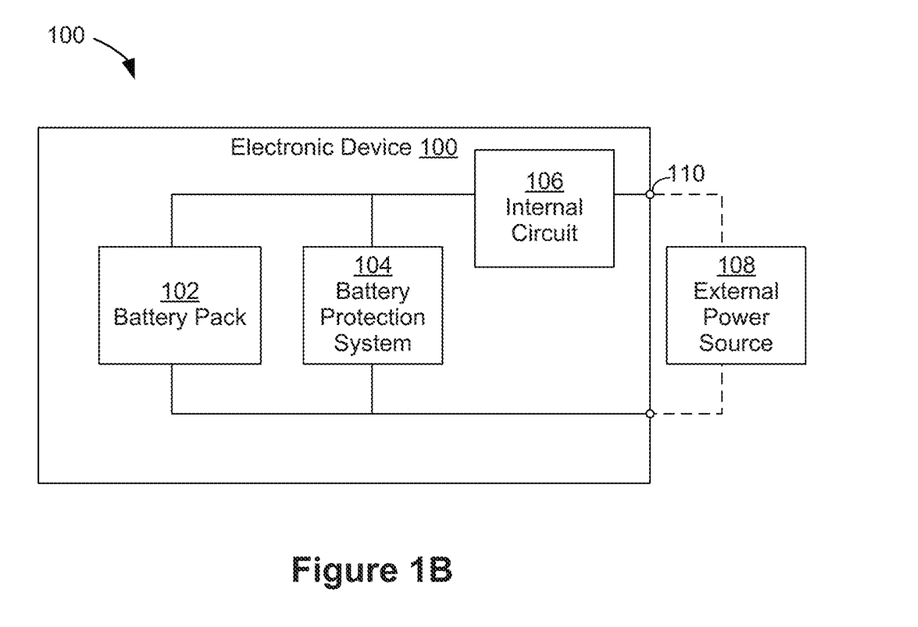
FIG. 1B illustrates a block diagram of an electronic device having a battery protection system, in accordance with some implementations.

FIG. 1B illustrates a block diagram of an electronic device 100 including a battery protection system 104, in accordance with some implementations. The electronic device 100 includes a battery 102. Optionally, the battery 102 is built into the electronic device 100 or is a replaceable module in the electronic device 100. In some implementations, the battery 102 includes a plurality of rechargeable battery cells electrically coupled at least partially in parallel (i.e., in such implementations the battery 102 can also be referred to as a battery pack). For example, in some implementations, the plurality of rechargeable battery cells of the battery 102 can be coupled according to a 1SnP parallel battery configuration, in which n is an integer indicating a number of battery cells connected in parallel (e.g., 1S2P, 1S3P, 1S4P) or a mSnP mixed battery configuration, in which m is an integer indicating a number of battery cells connected in series (e.g., 2S2P).

In some implementations, the battery 102 is electrically coupled to the battery protection system 104 and an internal circuit 106. The internal circuit 106 includes various components of the electronic device 100 such as CPU(s), memory, data input device(s), data output device(s), lens assemblies, heat sink(s), image sensor array(s), infrared illuminator(s), filter(s), etc. In some implementations, an external power source 108 is coupled to the battery 102 and the internal circuit 106. The external power source 108 is used to charge the battery 102 of the electronic device 100. In some implementations, the battery 102 and the battery protection system 104 are integrated into a single package/enclosure contained within the electronic device 100. In other implementations, the battery 102 and the battery protection system 104 are packaged as distinct packages/components within the electronic device 100.

In some implementations, the battery protection system 104 is configured to protect the battery 102 while the electronic device 100 is being charged by the external power source 108 and/or any other electrical source. In some implementations, the battery protection system 104 is designed within a protection circuit module of the battery 102. In some implementations, the battery protection system 104 is used to detect when at least one rechargeable battery (or battery cell) of the plurality of rechargeable battery cells that form the battery 102 disconnects. When at least one rechargeable battery disconnects, the battery protection system 104 disables charging of the battery 102. As discussed in reference to FIGS. 2A-6, in some implementations the battery protection system 104 includes a resistor electrically coupled in series to at least one rechargeable battery in the battery 102, a comparator coupled to the resistor, a switching component coupled to the battery 102, and a protection integrated circuit (PIC) coupled to the comparator and the switching component.

Figure 2A:
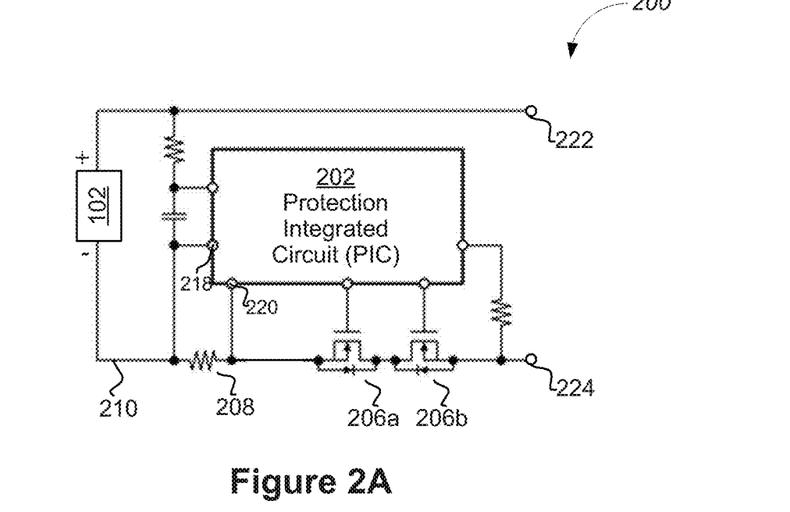
FIGS. 2A and 2B illustrate two example battery protection system, in accordance with some implementations.
Figure 2B:
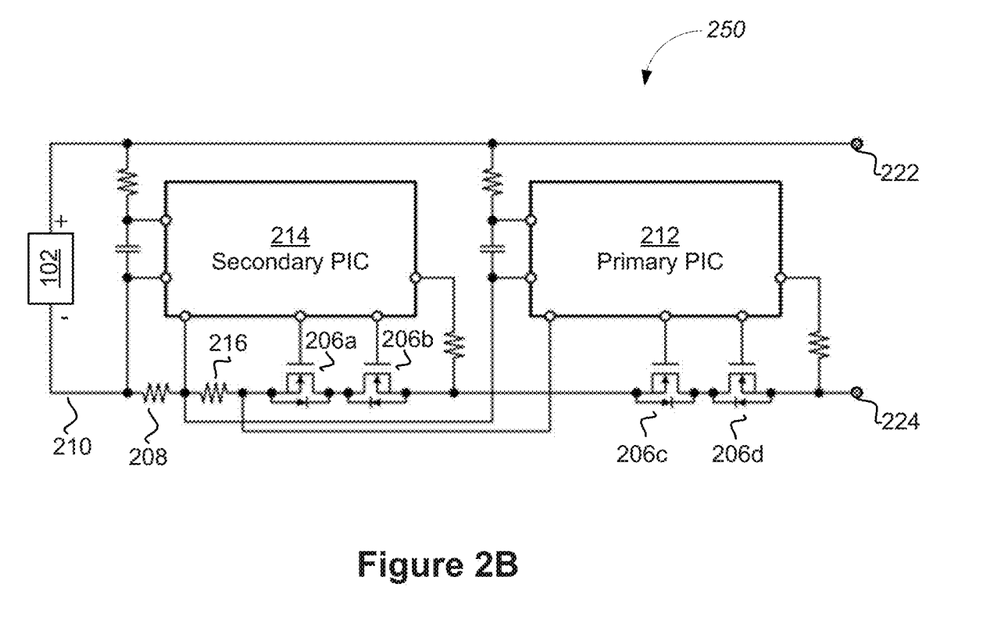

FIGS. 2A and 2B illustrate two example battery protection systems 200 and 250, in accordance with some implementations. FIGS. 2A and 2B are provided for explanation purposes and do not include all of the features of the present disclosure. FIG. 2A shows a single protection integrated circuit (PIC) 202, a battery 102, and one or more switches 206. The PIC 202 controls charging and discharging of the battery 102 through its internal logic and operation of the one or more switches 206. The one or more switches 206 are coupled to the battery 102 and facilitate the charging and discharging of the battery 102 as instructed by the PIC 202. In some implementations, the one or more switches 206 are coupled in series to each other along a charging path (e.g., the charging and discharging path 210) of the battery 102. In particular, the PIC 202 directs the current as needed to protect the battery 102 as described below. The battery 102 and the PIC 202 are electrically coupled in parallel between high and low battery supply nodes 222 and 224.

A serial resistor 208 is coupled in series with the battery 102 and the one or more switches 206 along the charging and discharging path 210 of the battery 102. In some implementations, the serial resistor 208 is immediately downstream of the battery 102 on a direct current (DC) charging and discharging path 210 (e.g., along the same current path that is going through the battery 102). In some implementations, the PIC 202 is coupled to the serial resistor 208. The PIC 202 is configured using internal/integrated comparator logic to monitor a voltage drop across the serial resistor 208 (coupled to the PIC 202 via the inputs 218 and 220) and determine whether a drive current of the battery 102 is at fault, e.g., whether the battery 102 is overcharged, undercharged, or shorted based on the voltage drop across the serial resistor 208. In some implementations, the PIC 202 includes a comparator configured to compare the voltage drop with one or more threshold voltages defined according to the undercharge, overcharge, or short currents.

In some implementations, the PIC 202 is configured to turn off a charging switch (e.g., switch 206b of the one or more switches 206) arranged on the charging and discharging path 210 of the battery 102 to disable charging of the battery 102. The charging switch 206b is turned off in accordance with a determination that the battery 102 is overcharged based on the voltage drop across the serial resistor 208. In some implementations, the PIC 202 is configured to turn off a discharging switch (e.g., switch 206a of the one or more switches 206) arranged on the charging and discharging path 210 of the battery 102 to disable discharging of the battery 102. The discharging switch 206a is turned off in accordance with a determination that the battery 102 is undercharged based on the voltage drop across the serial resistor 208.

In some implementations, the charging switch 206b and the discharging switch 206a are coupled in series with each other on the charging and discharging path 210 of the battery 102. In some implementations, the PIC 202 is configured to control charging and discharging of the battery 102 via the charging switch 206b and the discharging switch 206a, respectively. In some implementations, each of the charging and discharging switches 206b and 206a includes a transistor device having a gate controlled by the PIC 202. In some other implementations, each of the charging and discharging switches 206b and 206a includes a transmission gate made of a pair of P-type and N-type transistors.

FIG. 2B shows a primary PIC 212 and a secondary PIC 214, a battery 102, and one or more switches 206. The primary PIC 212 and the secondary PIC 214 are similar to the PIC 202 discussed with reference to FIG. 2A (e.g., they perform all of the PIC functions described with reference to FIG. 2A). The differences between the primary and secondary PICs 212 and 214 are the sensitivities of the respective PICs that are used for controlling the charging and discharging of the battery 102 via the one or more switches 206 (discussed in more detail below). In some implementations, two or more PICs are used to improve the overall safety of the electronic device. More specifically, the secondary PIC 214 is used as a fall back in case the primary PIC 212 fails. Further shown in FIG. 2B is a high battery supply node 222 and a low battery supply node 224. The battery 102, the primary PIC 212, and the secondary PIC 214 are electrically coupled in parallel between the high and low battery supply nodes 222 and 224, and the secondary PIC 214 is disposed between the battery 102 and the primary PIC 212. In some situations, both the primary PIC 212 and secondary PIC 214 are applied in the electronic device 100 to comply with a device safety standard, e.g., Standard for Household and Commercial Batteries UL 2054, Standard for Audio/Video (AV) and Information and Communication Technology (ICT) Equipment IEC 62368-1.

In some implementations, the primary and secondary PICs 212 and 214 are coupled to the battery 102. In some implementations, each PIC is configured to control a respective subset of switches 206. For example, the primary PIC 212 is configured to control the switches 206c and 206d, and the secondary PIC 214 is configured to control the switches 206a and 206b. As mentioned above in FIG. 2A, the one or more switches 206 are used with the respective PICs to control charging and discharging of the battery 102. In particular, the one or more switches 206 are coupled to the battery 102 and facilitate discharging and charging of the battery 102 as instructed by the primary PIC 212 and/or secondary PIC 214. In some implementations, the one or more switches 206 are coupled in series to each other along a charging path (e.g., charging and discharging path 210) of the battery 102.

In some implementations, a first serial resistor 208 and a second serial resistor 216 are coupled in series with each other and in series with the battery 102 along the charging and discharging path 210 of the battery 102. In some implementations, the same amount of direct current is configured to flow through the first serial resistor 208, the second serial resistor 216, and the battery 102 during charging and discharging of the battery 102. Similar to the configuration of FIG. 2A, the first serial resistor 208 and the second serial resistor 216 are immediately downstream of the DC charging and discharging path 210. In some implementations, the primary PIC 212 and the secondary PIC 214 are coupled to the first and second serial resistors 208 and 216 and configured to monitor voltage drops on the first and second serial resistors 208 and 216. The primary PIC 212 and the secondary PIC 214 determine whether the drive current of the battery is at fault, e.g., whether the battery 102 is overcharged, undercharged, or shorted based on the voltage drops on the first and second serial resistors 208 and 216, respectively. In some implementations, the primary PIC 212 monitors the voltage drop across the second serial resistor 216 to determine whether the battery 102 is overcharged, undercharged, or shorted. In some implementations, the secondary PIC 214 monitors the voltage drop across the first serial resistor 208 to determine whether the drive current of the battery 102 is at fault, e.g., whether the battery 102 is overcharged, undercharged, or shorted.

In some implementations, the primary PIC 212 is configured to control charging and discharging of the battery 102 according to a plurality of first charging and discharging settings (e.g., sensitivities for the primary PIC 212), and the secondary PIC 214 is configured to control charging and discharging of the battery 102 according to a plurality of second charging and discharging settings (e.g., sensitivities for the secondary PIC 214). Optionally, each of the second charging and discharging settings corresponds to and is distinct from a respective one of the first charging and discharging settings.

Similar to FIG. 2A, in some implementations, the primary and secondary PICS 212 and 214 are configured to turn off a charging switch (e.g., switch 206b and 206d of the one or more switches 206) arranged on the charging and discharging path 210 of the battery 102 to disable charging of the battery 102. The charging switch 206b is turned off in accordance with a determination that the battery 102 is at a risk of overcharging based on the voltage drop across the first and second serial resistors 208 and 216 and the respective charging and discharging settings (e.g., first and second charging and discharging settings) of the primary and secondary PICS 212 and 214. Further, in some implementations, the primary and secondary PICS 212 and 214 are configured to turn off a discharging switch (e.g., switch 206a and 206c of the one or more switches 206) arranged on the charging and discharging path 210 of the battery 102 to disable discharging of the battery 102. The discharging switch 206a is turned off in accordance with a determination that the battery 102 is undercharged based on the voltage drop across the first and second serial resistors 208 and 216 and the respective charging and discharging settings (e.g., first and second charging and discharging settings) of the primary and secondary PICS 212 and 214.

As with FIG. 2A, in some implementations, the charging switches (switches 206*b* and 206*d*) and the discharging switches (switches 206*a* and 206*c*) are coupled in series with each other on the charging and discharging path 210 of the battery 102. In some implementations, the primary and secondary PICs 212 and 214 are configured to control charging and discharging of the battery 102 via respective charging switches (switches 206*b* and 206*d*) and respective discharging switch (switches 206*a* and 206*c*), respectively. In some implementations, each of the charging and discharging switches (206*a*-206*d*) includes a transistor device having a gate controlled by respective PICs (e.g., the primary and secondary PICs 212 and 214). In some other implementations, each of the charging and discharging switches (206*a*-206*d*) includes a transmission gate made of a pair of P-type and/or N-type transistors.

For simplicity, FIGS. 2A and 2B describe a single battery 102; however, it should be noted that the battery 102 can be a battery 102 with multiple battery cells connected in a variety of parallel configurations. More details of the battery 102 are discussed with reference to FIGS. 1B and 7A-7D.

Figure 3A:
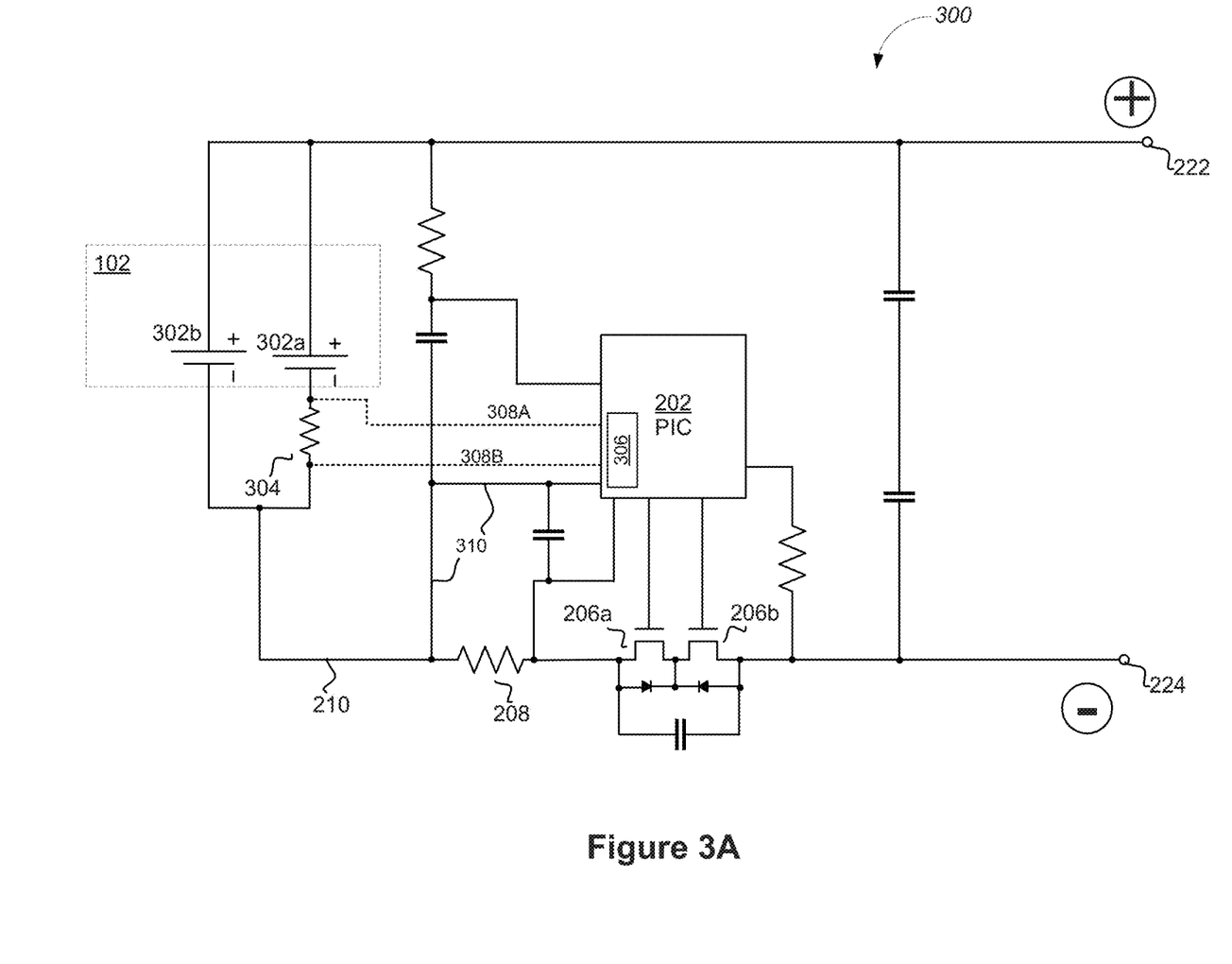
FIGS. 3A and 3B illustrate two example battery protection systems each of which includes at least one protection integrated circuit (PIC) integrated with a comparator, in accordance with some implementations.
Figure 3B:
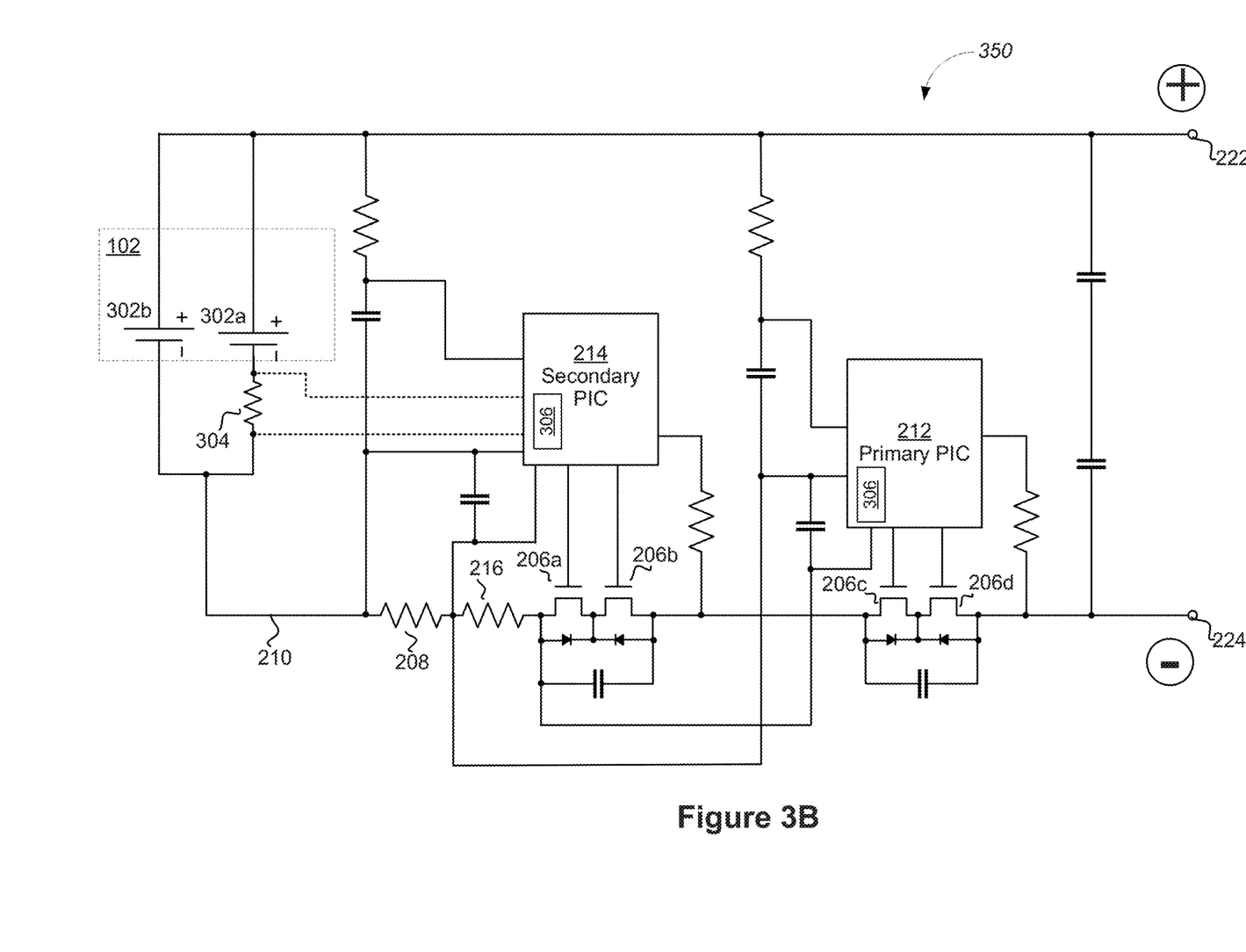

FIGS. 3A and 3B illustrate two example battery protection systems 300 and 350, each of which includes at least one protection integrated circuit (PIC) integrated with a comparator 306, in accordance with some implementations. The battery protection system 300 includes a single PIC 202, a battery 102, and one or more switches 206. The PIC 202 is coupled to one or more switches 206 as described above with reference to FIGS. 2A and 2B. A sense resistor 304 is electrically coupled in series with at least one rechargeable battery cell (e.g., the battery cell 302*a*) of a plurality of rechargeable battery cells 302. The plurality of rechargeable battery cells 302 are electrically coupled in parallel to form the battery 102. The PIC 202 includes an integrated comparator 306. The comparator 306 is electrically coupled to the sense resistor 304, and configured to compare a voltage drop across the sense resistor 304 with a reference voltage, thereby determining whether a subset (e.g., at least one) of the plurality of rechargeable battery cells 302 of the battery 102 is not charging/charged, when the battery 102 is connected to an external power source 108 to be charged. In some implementations, in accordance with a determination that a subset of the plurality of rechargeable battery cells 302 is not charging according to specification in the battery 102, the PIC 202 disables charging of the battery 102, e.g., by controlling one or more of the switches 206 (e.g., a charging switch 206*b*). Further, in some situations, in accordance with the determination that the subset of rechargeable battery cells is not charging in the battery 102, the PIC 202 also disables the discharging switch 206*a* in conjunction with the charging switch 206*b*, thereby disabling the battery 102 from driving the internal circuit 106 of the electronic device 100 as well.

Specifically, in some implementations, the battery 102 is connected to the external power source 108 to be charged. When the comparator 306 integrated in the PIC 202 determines that the voltage drop across the sense resistor 304 is less than a first threshold voltage or greater than a second threshold voltage, it is determined that at least a subset of the plurality of rechargeable battery cells 302 of the battery 102 is not charging. The PIC 202 then turns off a charging switch 206*b* or a discharging switch 206*a* coupled along the charging and discharging path 210 of the battery 102. The first and second thresholds can be used to make a determination that at least one rechargeable battery cell of the plurality of rechargeable battery cells 302 is not charging. In some implementations, the first threshold voltage is a small voltage that is at or near 0V (e.g., in some implementations less than 0.01V), which is indicative of little or no current flowing through the sense resistor 304 itself. That said, when the voltage drop across the sense resistor 304 is less than the first threshold voltage, little to no current is passing through the rechargeable battery cell 302*a*, indicating that the rechargeable battery cell 302*a* is not charging.

Alternatively, in some situations, the rechargeable battery cell 302*a* is coupled properly, while the rechargeable battery cell 302*b* is disconnected or not charging, causing an excessive current through the rechargeable battery cell 302*a*. The second threshold voltage corresponds to a larger voltage across the sense resistor 304 than a nominal voltage drop and indicates that the excessive current is passing through the rechargeable battery cell 302*a* due to a different rechargeable battery cell 302*b* not charging. In an example, a nominal current $I_0$ passes through the rechargeable battery cell 302*a* during normal operation of the battery 102 when all battery cells 302 function and are charging properly. The sense resistor 304 has a resistance of $R_S$, and the nominal voltage drop across the sense resistor 304 is $I_0 R_S$ during the normal operation. The second threshold voltage optionally corresponds to (e.g., is defined to be) 1.5 times the nominal voltage drop of the rechargeable battery cell 302*a*, i.e., the second threshold voltage is scaled from the nominal voltage drop by a factor of 1.5. Alternatively, the second threshold voltage corresponds to a safety current threshold $I_S$ (e.g., is defined to be $I_S R_S$). The rechargeable battery cell 302*a* may continue to charge if one or more other parallel battery cells are decoupled, and the battery 102 is disabled from charging only if a current flowing through the rechargeable battery cell 302*a* exceeds the safety current threshold.

Alternatively or additionally, in some implementations, the comparator integrated in the PIC 202 determines that the voltage drop across the sense resistor 304 is between the first threshold voltage and the second threshold voltage, indicating that the battery 102 is operating properly without any battery cell being decoupled or disconnected from charging. The comparator 306 integrated in the PIC 202 determines that there are no detectable disconnects of plurality of rechargeable battery cells 302 coupled in parallel. In this way, the battery 102 is charged as normal unless an overcharge, undercharge, or short condition is identified based on a voltage drop across the serial resistor 208 (as described with reference to FIGS. 2A and 2B).

Referring to FIG. 3A, the comparator 306 is integrated in the PIC 202, i.e., is a component of the PIC 202. The PIC 202 and the comparator 306 are formed on a first substrate. In some implementations, the one or more switches 206 are formed on a second substrate distinct from the first substrate. Although not shown, in some other implementations, the one or more switches 206 can be integrated on the PIC 202 (e.g., formed on the first substrate). Alternatively, in some implementations, one or more switches 206, the PIC 202, and the comparator 306 can each be on a distinctive substrate, while the comparator 306 and the PIC 202 are optionally packaged within the same semiconductor package.

In some implementations, the PIC 202 is coupled in the battery protection system 300 via a plurality of input/output pins (I/O) pins of the PIC 202. For example, the PIC 202 is coupled in the battery protection systems in FIGS. 2A and 2B via six I/O pins. Conversely, in the battery protection system 300, the PIC 202 keeps the six I/O pins and includes one or two additional pins to be coupled to the sense resistor 304 via interconnects 308A and 308B, respectively. The interconnect 308B provides a direct path from a terminal of the sense resistor 304 to the PIC 202. In some implementations, the interconnect 308B is replaced with a combination of part of the path 210 and an interconnect 310 to a terminal of the serial resistor 208, thereby allowing the PIC 202 to add a single pin associated with the interconnect 308A while still receiving the voltage drop of the sense resistor.

Referring to FIG. 3B, the battery protection system 350 includes a primary PIC 212 and a secondary PIC 214, the battery 102, and one or more switches 206. The primary and secondary PICS 212 and 214 are coupled to respective subsets of one or more switches 206 described with reference to FIG. 2B. The one or more switches 206 are coupled to the battery 102 and configured to enable/disable charging and discharging of the battery 102 under the control of the primary and secondary PICS 212 and 214. In some implementations, the secondary PIC 214 is used as a fallback in case the primary PIC 212 fails.

In some implementations, the secondary PIC 214 includes an integrated comparator 306. The comparator 306 integrated in the secondary PIC 214 is electrically coupled to the sense resistor 304 and configured to compare a voltage drop across the sense resistor 304 with a reference voltage to determine whether one or more of the rechargeable battery cells 302 is not charging in the battery 102. The secondary PIC 214 is configured to disable charging of the battery 102 (e.g., by disabling the switch 206a) based on a determination that a subset of the rechargeable battery cells 302 is not charging in the battery 102. Alternatively, in some implementation, the primary PIC 214 includes an integrated comparator 306 coupled to the sense resistor 304. The primary PIC 214 is configured to disable charging of the battery 102 (e.g., by disabling the switch 206c) based on a determination that a subset of the rechargeable battery cells 302 is not charging in the battery 102. Optionally, only one of the primary and secondary PICS 202 and 204 includes the comparator 306. Further, in some situations, in accordance with the determination that the subset of rechargeable battery cells is not connected, or otherwise charging in the battery 102, the PIC 212 or 214 also disables the discharging switch 206c or 206a in conjunction with the charging switch 206d or 206b, thereby disabling the battery 102 from driving the internal circuit 106 of the electronic device 100 as well.

In some implementations, each of the primary and secondary PICS 202 and 204 includes a respective comparator 306 and sets a distinct reference voltage to determine whether a subset of the rechargeable battery cells 302 is not charging in the battery 102. The comparators 306 in the primary and secondary PICS 202 and 204 are optionally coupled to the same sense resistor 304 or two distinct sense resistors. The two distinct sense resistors are optionally coupled in series with the rechargeable battery cell 302a or coupled separately to two distinct rechargeable battery cells. Each of the primary and secondary PICS 202 and 204 is configured to disable charging of the battery 102 (e.g., by disabling the switch 206a or 206c) independently, based on a determination that a subset of the rechargeable battery cells 302 is not charging normally using a respective integrated comparator 306.

It should be noted that although the battery 102 illustrated in FIG. 3A or 3B includes two rechargeable battery cells coupled in parallel, any number of rechargeable battery cells coupled in parallel can form the battery 102. More details on battery configurations are described below with reference to FIGS. 7A-7D. In some implementations, a single sense resistor 304 is used (coupled in series with a rechargeable battery cell) to determine whether at least one rechargeable battery of the plurality of rechargeable battery cells is not charging normally. In some implementations, more than one sense resistor 304 can be used to determine whether at least one rechargeable battery cell of the plurality of rechargeable battery cells is not charging (e.g., by monitoring the voltage drop across a respective sense resistor 304).

Figure 4A:
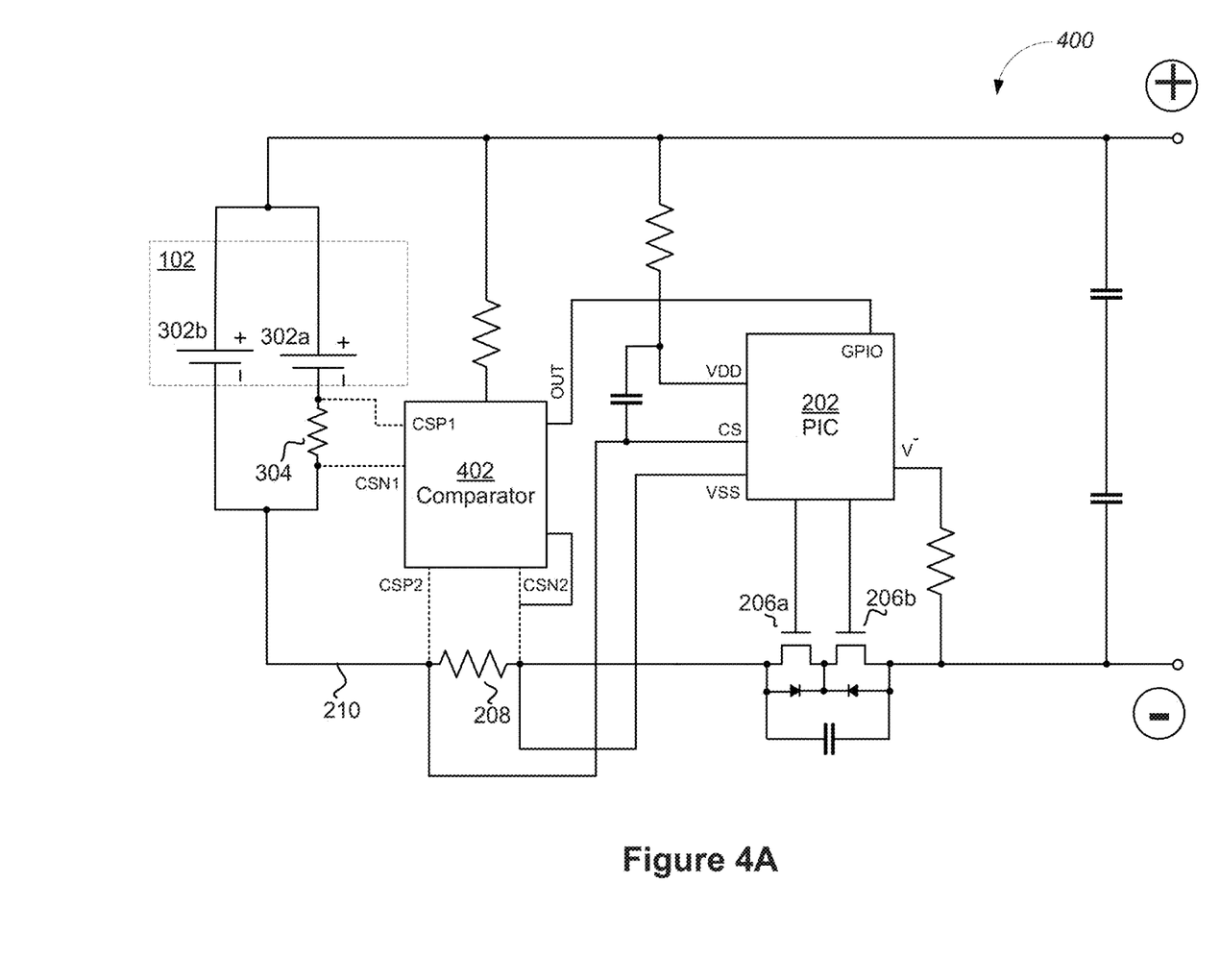
FIGS. 4A and 4B illustrate two example battery protection systems each of which includes one or more PICs and a discrete comparator, in accordance with some implementations.
Figure 4B:
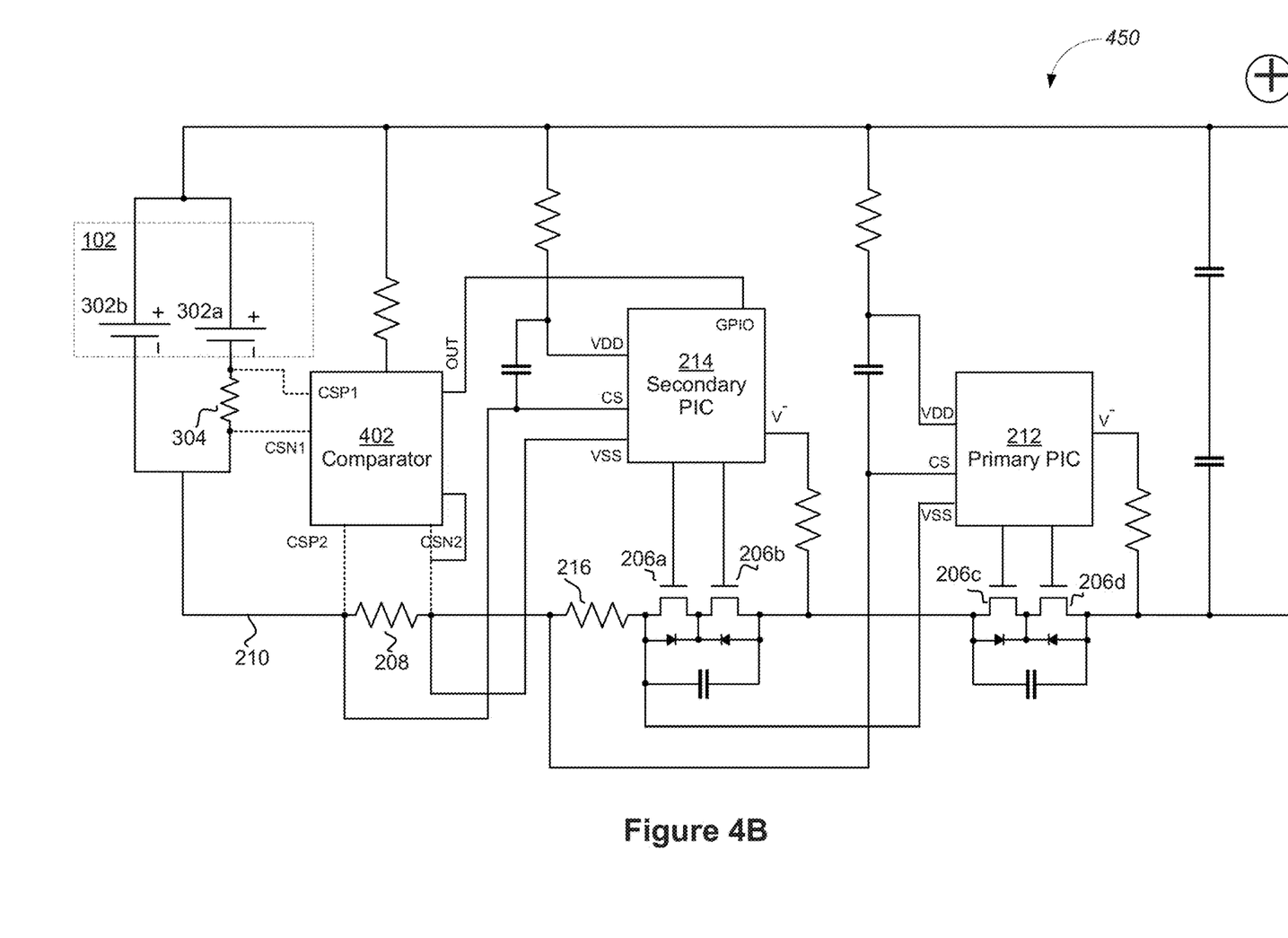

FIGS. 4A and 4B illustrate two example battery protection systems 400 and 450 each of which includes one or more PICs and a discrete comparator 402, in accordance with some implementations. The discrete comparator 402 is formed on a separate and distinct substrate from the PICs (e.g., PICs 202, 212 and/or 214). The battery protection system 400 includes a single PIC 202, a battery 102, and one or more switches 206, a serial resistor 208, a sense resistor 304, and a comparator 402. The one or more switches 206 are coupled to the battery 102 and controlled by the PIC 214 to control charging and discharging of the battery 102. For example, the PIC 202 shown in FIG. 4A can determine overcharge, undercharge, and/or shorted conditions based on the voltage drop across a serial resistor 208 and control the one or more switches 206 in accordance with a determination of these conditions.

Referring to FIG. 4A, the comparator 402 is coupled to the sense resistor 304 and the PIC 202. The comparator 402 determines whether at least one rechargeable battery cell of the rechargeable battery cells 302 coupled in parallel is not charging during a charging operation by monitoring a voltage drop across the sense resistor 304. The comparator 402 works in conjunction with the PIC 202 to disable the battery 102 from being charged when it is detected that a rechargeable battery (e.g., 302a or 302b) is not charging. In some implementations, the comparator 402 is also coupled to the serial resistor 208 and can determine a voltage drop across the serial resistor 208. In some implementations, the comparator 402 can determine overcharge, undercharge, and shorted conditions based on the voltage drop across the serial resistor 208 (e.g., by comparing the voltage drop across the serial resistor 208 with an overcharge, undercharge or short-circuit voltage reference).

Referring to FIG. 4B, the battery protection system 450 includes a primary PIC 212 and a secondary PIC 214, the battery 102, one or more switches 206, a serial resistor 208, a sense resistor 304, and a comparator 402. The primary and secondary PICs 212 and 214 are coupled to respective subsets of one or more switches 206. The one or more switches 206 are coupled to the battery 102 and controlled by the primary and secondary PICs 212 and 214 to control charging and discharging of the battery 102. In some implementations as shown in FIG. 4B, the comparator 402 is coupled to the secondary PIC 214 and the sense resistor 304, and configured to determine whether one or more of the rechargeable battery cells 302 is not charging in the battery 102 (e.g., disconnected or decoupled), thereby allowing the secondary PIC 214 to turn off the charging switch 206b when a subset of the rechargeable battery cells 302 is not charging in the battery 102. Alternatively, in some implementations not shown in FIG. 4B, the comparator 402 is not coupled to the secondary PIC 214, but coupled to the primary PIC 212, and configured to determine whether one or more of the rechargeable battery cells 302 is not charging in the battery 102, thereby allowing the primary PIC 212 to turn off the switch 206d when a subset of the rechargeable battery cells 302 is not charging in the battery 102. Further, in some implementations not shown in FIG. 4B, the comparator 402 is coupled to both the primary and secondary PICS 212 and 214, allowing both PICS 212 and 214 to turn off the switches 206a and 206c when a subset of the rechargeable battery cells 302 is not charging.

Further, in some implementations not shown in FIG. 4B, the battery protection system 450 includes a second comparator (not shown) coupled to the sense resistor 304 and the primary PIC 212, while the comparator 402 is coupled to the sense resistor 304 and the secondary PIC 214. The second comparator is configured to determine whether one or more of the rechargeable battery cells 302 is not charging in the battery 102 independently of the comparator 402, thereby allowing the primary PIC 212 to turn off the switch 206d independently of the secondary PIC 214 turning off the switch 206b when a subset of the rechargeable battery cells 302 is not charging in the battery 102. In some implementations, the second comparator is coupled to a distinct sense resistor from the sense resistor 304. The distinct sense resistor is optionally coupled in series with any of the rechargeable battery cells in the battery 102.

Further, in some situations, in accordance with a determination that the subset of rechargeable battery cells is not charging in the battery 102, the PIC 202 also disables the discharging switch 206a in conjunction with the charging switch 206b, and the PIC 212 or 214 also disables the discharging switch 206c or 206a in conjunction with the charging switch 206d or 206b, respectively. Thus, when one or more battery cells in a parallel battery 102 are not charging, the battery protection systems 400 and 450 disable the battery 102 from driving the internal circuit 106 of the electronic device 100 as well.

Figure 5:
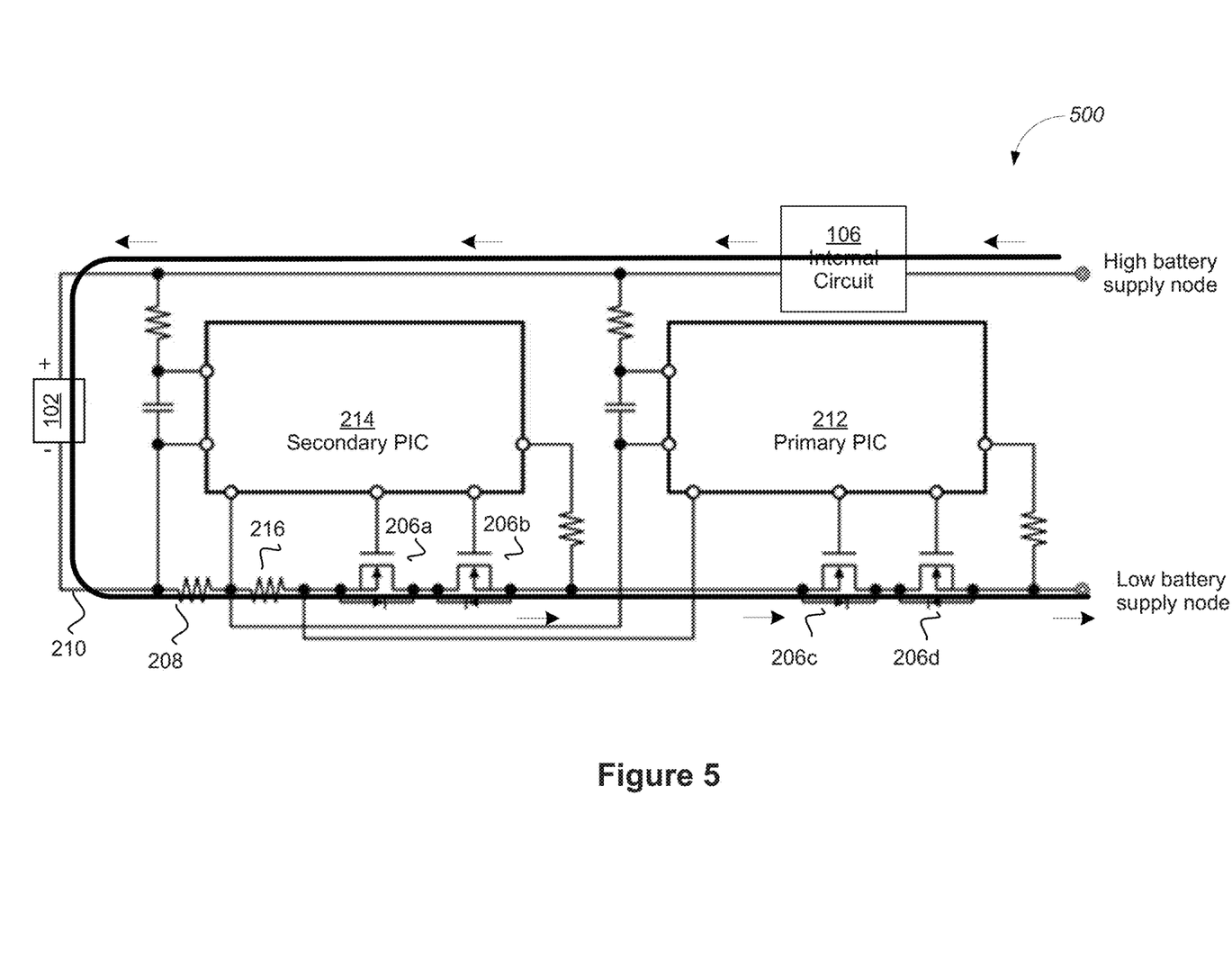
FIG. 5 illustrates an example current path in a battery protection system when a battery is charged by an external power source, in accordance with some implementations.

FIG. 5 illustrates an example current path in a battery protection system 104 when a battery 102 is charged by an external power source 108, in accordance with some implementations. The battery protection system 500 includes a primary PIC 212 and a secondary PIC 214. The battery 102, the primary PIC 212, and the secondary PIC 214 are coupled to a high battery supply node 222 and a low battery supply node 224. Current flows from the high battery supply node 222 to the low battery supply node 224, passing through the internal circuit 106 and battery 102. The current is provided to, or outputted from, the battery 102 until a charging switch (e.g., 206b and 206d) or a discharging switch (e.g., 206a and 206c) is turned off. In some implementations, the PICs 212 and 214 monitor voltage drops across serial resistors 208 and 216 to determine whether an overcharge, undercharge or short circuit situation has occurred and control the switches 206 accordingly. Additionally, referring to FIGS. 3A-3B and 4A-4B, the battery 102 includes a plurality of rechargeable battery cells that are coupled in parallel. A direct current charges the battery 102 via the charging and discharging path 210 of the battery 102, until a rechargeable battery cell of the plurality of rechargeable battery cells 302 is detected as not charging. More details on detection of non-charging of a rechargeable battery in the battery 102 are discussed above with reference to FIGS. 3A-3B and 4A-4B.

Likewise, in some implementations not shown in FIG. 5, the battery 102 is discharged to drive the internal circuit 106 of the electronic device 100. The external power source 108 is optionally disconnected. Drive current flows from an anode to a cathode of the battery 102. The discharging switches 206a and 206c are used to control the DC charging and discharging path 210, e.g., disabling the current flow from the battery 102 upon detection of one or more faults during battery discharging.

Figure 6:
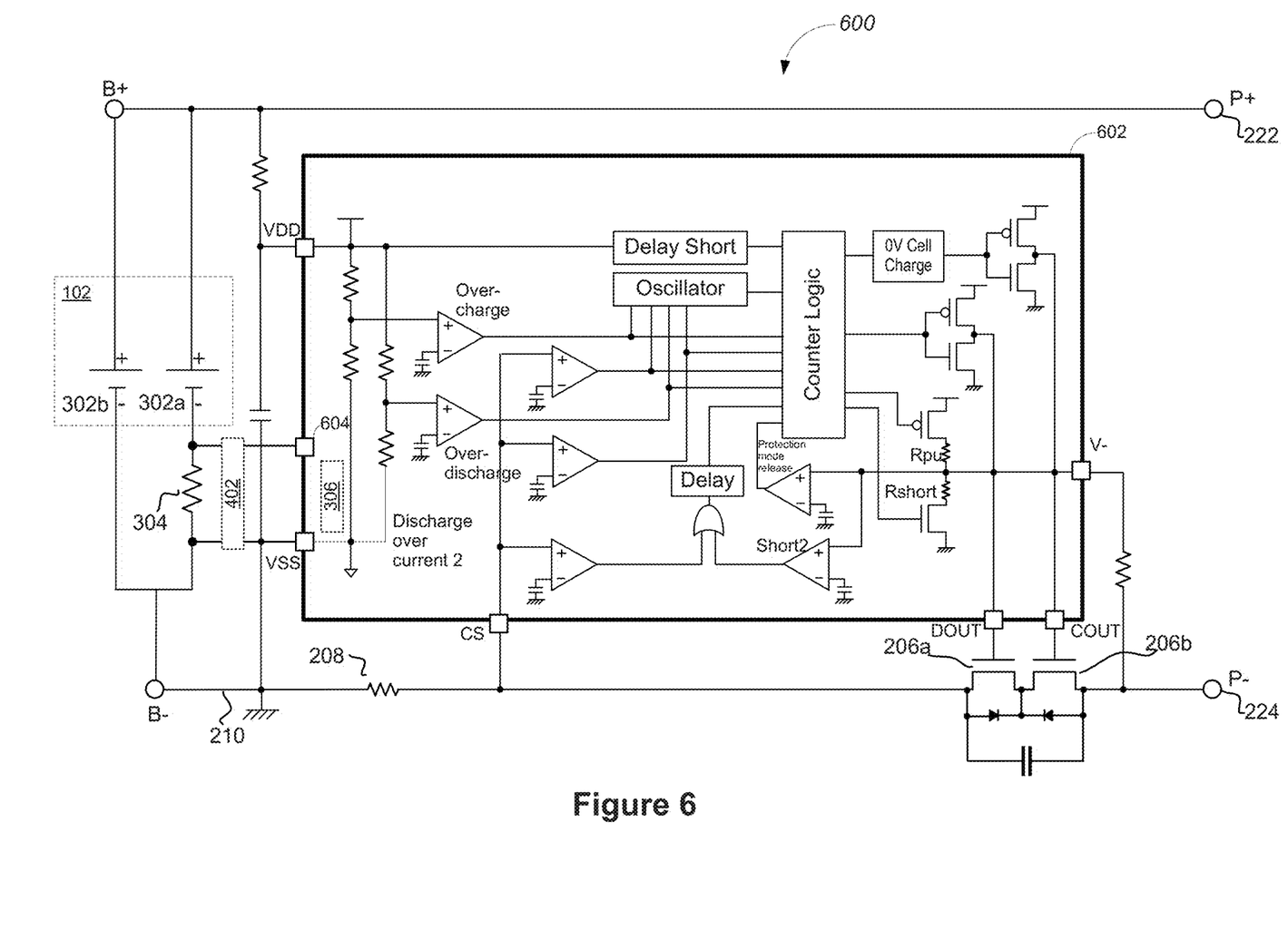
FIG. 6 illustrates a circuit diagram of an example PIC that is coupled to a battery, in accordance with some implementations.

FIG. 6 illustrates a battery 102 and a battery protection system 600 having a PIC 602 in accordance with some implementations. The PIC 602 is optionally used as any one of the PICs in the above battery protection systems 104, 300, 350, 400, 450 and 500. The PIC 602 includes one or more components that are optionally formed on the same substrate or different substrates. When formed on the different substrates, the one or more components are disposed in a single semiconductor package. In some implementations, the one or more components define charging and discharging settings of the PIC 602. For example, the one or more components are configured to set parameters associated with the overcharge, undercharge, and short conditions that trigger the discharging and/or charging switches (e.g., switches 206).

In some implementations, a comparator 306 is coupled to a sense resistor 304 that is coupled in series to a rechargeable battery of a plurality of rechargeable battery cells 302 and integrated into the PIC 602. The comparator 306 is configured to detect when a rechargeable battery of a battery 102 is not charging according to specification. The comparator 306 works in conjunction with the PIC 602 to disable charging of the battery 102. In some situations, only a single I/O pin 604 is added or only a single unused I/O pin 604 is enabled for the purposes of coupling to a terminal of the sense resistor 304. Conversely, in some implementations, a discrete comparator 402 is coupled between the sense resistor 304 and the PIC 602. The comparator 402 is configured to detect when a rechargeable battery cell of a battery 102 is not charging in conjunction with the PIC 602. In some situations, the single I/O pin 604 is added or the single unused I/O pin 604 is enabled for the purposes of receiving an output of the discrete comparator 402.

Figure 7A:
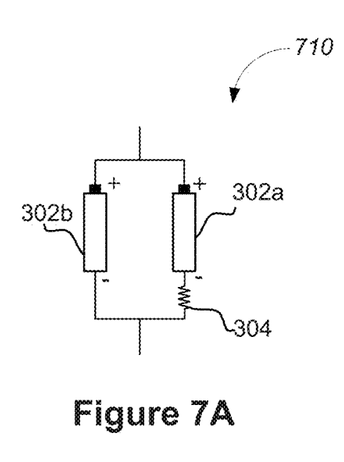
FIGS. 7A-7D are four example battery configurations, in accordance with some implementations.
Figure 7B:
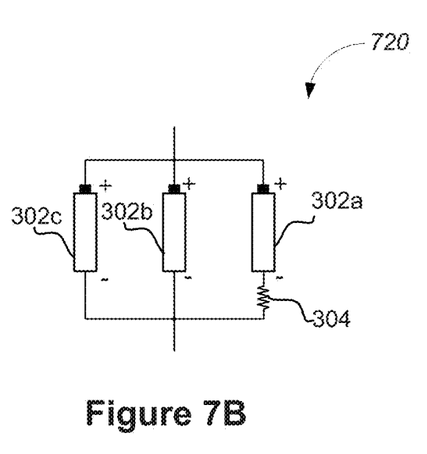

FIGS. 7A-7B illustrate four example battery configurations 710, 720, 730 and 740 in accordance with some implementations. A plurality of rechargeable battery cells is optionally arranged according to one of the battery configurations 710, 720, 730 and 740 in a battery 102. The battery configuration 710 is a 1S2P battery configuration in which two battery cells 302a and 302b are arranged in parallel. The sense resistor 304 is arranged in series with the battery cell 302a. A nominal voltage drop across the sense resistor 304 is $I_0R_S$ during normal operation of the battery, i.e., when all battery cells are charging according to specification in the battery 102. When the battery cell 302a or 302b is not charging, a voltage drop across the sense resistor 304 is either at or near 0 V or greater than $I_0R_S$ (e.g., equal to $2I_0R_S$). The comparator 306 or 402 may set one or more reference voltages (e.g., two reference voltages at 0.01V and 1.5 $I_0R_S$) according to such a voltage drop across the sense resistor 304.

The battery configuration 720 is a 1S3P battery configuration in which three battery cells 302a, 302b and 302c are arranged in parallel. The sense resistor 304 is arranged in series with the battery cell 302a. A nominal voltage drop across the sense resistor 304 is $I_0R_S$ during normal operation of the battery. When a subset of the battery cells 302a-302c does not charge, a voltage drop across the sense resistor 304 is either at or near 0 V or greater than $I_0R_S$ (e.g., equal to $1.5I_0R_S$ or $3I_0R_S$). The comparator 306 or 402 may set one or more reference voltages (e.g., two reference voltages at 0.01V and $1.25I_0R_S$) according to such a voltage drop across the sense resistor 304. It would be apparent to one skilled in the art that the plurality of rechargeable battery cells could be configured according to any other 1SnP battery configuration, where n is an integer greater than 3, and that the battery protection system described herein could be extended to provide protection of any such configuration.

Figure 7C:
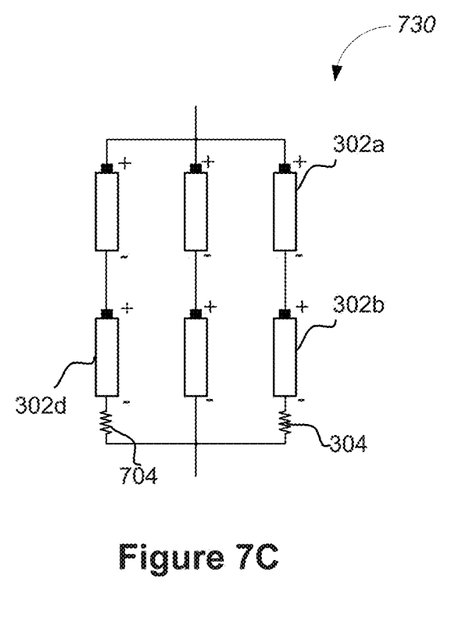

The battery configuration 730 is a first 2S3P battery configuration in which two serial battery cells are arranged in parallel with another two sets of serial battery cells. The sense resistor 304 is arranged in series with the battery cells 302a and 302b. That said, in this configuration, the plurality of rechargeable battery cells 302 includes a plurality of parallel battery cell subsets (e.g., three parallel battery subsets), and each battery cell subset includes a predefined number of battery cells (e.g., two battery cells 302a and 302b) arranged in series with each other. The predefined number may be equal to two or more.

Figure 7D:
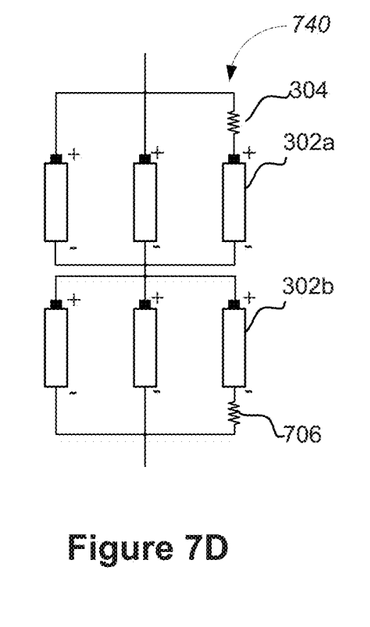

Conversely, the battery configuration 740 is a second 2S3P battery configuration in which a first set of three parallel battery cells are arranged in series with a second set of parallel battery cells. The sense resistor 304 is arranged in series with the battery cell 302a. A nominal voltage drop across the sense resistor 304 is $I_0R_S$ during normal operation of the battery. When one or more battery cells in the first set do not charge, a voltage drop across the sense resistor 304 is either at or near 0 V or greater than $I_0R_S$ (e.g., equal to $1.5I_0R_S$ or $3I_0R_S$). The comparator 306 or 402 may set one or more reference voltages (e.g., two reference voltages at 0.01V and $1.25I_0R_S$) according to such a voltage drop across the sense resistor 304. Likewise, another sense resistor 706 may be arranged in series with the battery cell 302b and configured to monitor whether one or more battery cells in the second set do not charge. It would be apparent to one skilled in the art that the plurality of rechargeable battery cells could be configured according to any other mSnP battery configuration, where m is an integer equal to one or more, and n is an integer equal to two or more, and that the battery protection system described herein could be extended to provide protection of any such configuration.

In some implementations, the battery 102 is not damaged when a small portion of the parallel rechargeable battery cells does not charge. For example, for a 1S3P battery configuration 720, the battery 102 is disabled from being charged only when two of the three battery cells are disabled from charging. Then, the comparator 306 or 402 may vary the reference voltages (e.g., increase a reference of $1.25I_0R_S$ to $1.5I_0R_S$) accordingly.

Referring to FIG. 7C, in some implementations, a distinct sense resistor 704 is applied and coupled to another battery cell 302d that is not in series with the sense resistor 304. The comparator 306 or 402 is coupled to both of the sense resistors 304 and 704 via a multiplexer. The multiplexer selects one of the sense resistors 304 and 704. The comparator compares the voltage drop across the selected sense resistor to determine which subset of the battery cells is not charging.

It is noted that in some implementations, a method is implemented to protect a battery 102 that has already been coupled to at least one PIC (e.g., PIC 202, 212 or 214). A sense resistor (e.g., the resistor 304 or 402) is added to be electrically coupled in series with one of a plurality of rechargeable battery cells 302 in a parallel battery 102. A comparator 402 is then coupled to the sense resistor and configured to compare a voltage drop across the sense resistor with a reference voltage to determine whether a subset of the plurality of rechargeable battery cells is charging in the battery when the battery 102 is coupled to an external power source 108 for charging. In some implementations, the reference voltage includes a first threshold voltage and a second threshold voltage, and the comparator is configured to determine that the voltage drop across the sense resistor is less than the first threshold voltage or greater than the second threshold voltage. The comparator is coupled to the at least one PIC, thereby allowing the at least one PIC to disable the battery from being charged in accordance with a determination that a subset of the plurality of rechargeable battery cells is not charging according to specification.

Reference has been made in detail to implementations, examples of which are illustrated in the accompanying drawings. In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations. In addition, it should be noted that details described with respect to any one of the battery protection systems of FIGS. 1-6 are also applicable in an analogous manner to any other one of the battery protection systems of FIGS. 1-6. For brevity, the analogous details are not repeated.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

What is claimed is:

1. A battery protection system, comprising:
   a sense resistor electrically coupled in series with one of a plurality of rechargeable battery cells in a battery, the plurality of rechargeable battery cells being electrically coupled in parallel to form the battery;
   a comparator coupled to the sense resistor and configured to compare a voltage drop across the sense resistor with a reference voltage to determine whether a subset of the plurality of rechargeable battery cells is not charging in the battery;
   a first switching component coupled to the battery; and
   a first protection integrated circuit (PIC) coupled to the comparator and the first switching component, the first PIC being configured to control charging and discharging of the battery including disabling the battery from being charged based on a determination that a subset of the plurality of rechargeable battery cells is not charging in the battery.

2. The battery protection system of claim 1, wherein the comparator and the first PIC are formed on a first substrate.

3. The battery protection system of claim 1, wherein the comparator is a discrete component including a first substrate, and the first PIC includes a second substrate that is distinct from the first substrate.

4. The battery protection system of claim 1, wherein the reference voltage includes a first threshold voltage and a second threshold voltage, and the comparator is configured to:
determine that the voltage drop across the sense resistor is less than the first threshold voltage or greater than the second threshold voltage; and
based on the determination, determine that at least a subset of the plurality of rechargeable battery cells is not charging in the battery.

5. The battery protection system of claim 4, wherein based on the determination that that the voltage drop across the sense resistor is less than the first threshold voltage or greater than the second threshold voltage, the first PIC is configured to turn off a charging switch arranged on a charging and discharging path of the battery and disable the battery from being charged.

6. The battery protection system of claim 1, further comprising:
a first serial resistor coupled in series with the battery and the first switching component on a charging and discharging path of the battery;
wherein the first PIC is coupled to the first serial resistor and configured to monitor a voltage drop across the first serial resistor and determine whether the battery is overcharged, undercharged, or shorted based on the voltage drop across the first serial resistor.

7. The battery protection system of claim 6, wherein the first PIC is configured to:
turn off a charging switch arranged on the charging and discharging path of the battery to disable charging of the battery based on a determination that the battery is overcharged as indicated by the voltage drop across the first serial resistor;
turn off a discharging switch arranged on the charging and discharging path of the battery to disable discharging of the battery based on a determination that the battery is undercharged as indicated by the voltage drop across the first serial resistor.

8. The battery protection system of claim 1, wherein:
the first switching component includes a charging switch and a discharging switch that are coupled in series with each other on a charging and discharging path of the battery; and
the first PIC is configured to control charging and discharging of the battery via the charging switch and the discharging switch, respectively.

9. The battery protection system of claim 8, wherein each of the charging and discharging switches includes a transistor device having a gate controlled by the first PIC.

10. The battery protection system of claim 1, further comprising:
a second switching component coupled to the battery; and
a second PIC coupled to the second switching component, wherein the second PIC is configured to control charging and discharging of the battery, and the second PIC is not coupled to the comparator.

11. The battery protection system of claim 10, further comprising:
a first serial resistor and a second serial resistor that are coupled in series with each other and in series with the battery on a charging and discharging path of the battery, wherein the same amount of direct current is configured to flow through the first serial resistor, the second serial resistor, and the battery during charging and discharging of the battery;
wherein the first and second PICs are coupled to the first and second serial resistors and configured to monitor voltage drops across the first and second serial resistors and determine whether the battery is overcharged or undercharged based on the voltage drops across the first and second serial resistors, respectively.

12. The battery protection system of claim 10, wherein:
the first PIC is configured to control charging and discharging of the battery according to a plurality of first charging and discharging settings; and
the second PIC is configured to control charging and discharging of the battery according to a plurality of second charging and discharging settings, wherein each of the second charging and discharging settings corresponds to and is distinct from a respective one of the first charging and discharging settings.

13. The battery protection system of claim 1, wherein:
the battery protection system is enclosed in an electronic device with the battery;
the battery is configured to be charged via a cable connected to an external power source; and
the electronic device includes a power connector exposed on an exterior surface of the electronic device and configured to receive the cable for charging the battery.

14. The battery protection system of claim 13, wherein the electronic device is one of a camera device, a doorbell, a hazard detector, a display assistance device, or a speaker assistance device.

15. The battery protection system of claim 1, wherein the plurality of rechargeable battery cells are arranged in a 1S2P configuration.

16. The battery protection system claim 1, wherein the plurality of rechargeable battery cells includes a plurality of parallel battery cell subsets, and each battery cell subset includes a predefined number of battery cells arranged in series with each other, the predefined number being equal to two or more.

17. A method of protecting a battery, the method comprising:
at a battery protection system including:
a sense resistor electrically coupled in series with one of a plurality of rechargeable battery cells in a battery, the plurality of rechargeable battery cells being electrically coupled in parallel to form the battery,
a comparator coupled to the sense resistor,
a first switching component coupled to the battery, and
a first protection integrated circuit (PIC) coupled to the comparator and the first switching component, the first PIC is configured to control charging and discharging of the battery;
comparing a voltage drop across the sense resistor with a reference voltage to determine whether a subset of the plurality of rechargeable battery cells is not charging in the battery; and
disabling the battery from being charged based on the determination that a subset of the plurality of rechargeable battery cells is not charging in the battery.

18. A method of protecting a battery, the method comprising:
- providing a sense resistor electrically coupled in series with one of a plurality of rechargeable battery cells in the battery:
  - the plurality of rechargeable battery cells being electrically coupled in parallel to form the battery; and
  - the battery being coupled to a first switching component and a first protection integrated circuit (PIC), the first PIC being configured to control charging and discharging of the battery via the first switching component; and
- providing a comparator coupled to the sense resistor and configured to compare a voltage drop across the sense resistor with a reference voltage to determine whether a subset of the plurality of rechargeable battery cells is not charging in the battery, including:
  - coupling the comparator to the first PIC, thereby allowing the first PIC to disable the battery from being charged based on a determination that a subset of the plurality of rechargeable battery cells is not charging in the battery.

19. The method of claim 18, wherein the reference voltage includes a first threshold voltage and a second threshold voltage, and the comparator is configured to:
- determine that the voltage drop across the sense resistor is less than the first threshold voltage or greater than the second threshold voltage; and
- based on the determination, determine that at least a subset of the plurality of rechargeable battery cells is not charging in the battery.

20. The method of claim 18, wherein the plurality of rechargeable battery cells is arranged in a 1S2P configuration.

* * * * *